United States Patent [19]

Berkovic et al.

[11] Patent Number: 5,262,890
[45] Date of Patent: Nov. 16, 1993

[54] METHOD AND SYSTEM FOR PRODUCING SECOND ORDER NONLINEAR OPTICAL EFFECTS

[75] Inventors: Garry Berkovic; Valeri Krongauz; Schlomo Yitzchaik, all of Rehovot, Israel

[73] Assignee: Yeda Research and Development Co., Ltd., Rehovot, Israel

[21] Appl. No.: 644,371

[22] Filed: Jan. 23, 1991

[51] Int. Cl.$^5$ .............................................. G02F 1/37
[52] U.S. Cl. ................................................... 359/328
[58] Field of Search ........................................ 359/328

[56] References Cited

U.S. PATENT DOCUMENTS

| 5,028,109 | 7/1991 | Lawandy | 359/328 |
| 5,037,582 | 8/1991 | Miyata et al. | 359/328 |
| 5,045,364 | 9/1991 | Fang | 359/328 |

OTHER PUBLICATIONS

D. J. Williams, Organic Polymeric and Non-Polymeric Materials with Large Optical Nonlinearities, Angew. Chem. Int. Ed. Eng. 23 (1984) 690–703.
J. Zyss, Nonlinear Organic Materials for Integrated Optics: a Review, Journal of Molecular Electronics vol. 1 25–45 (1985).
G. W. Gray, Molecular Structure and the Properties of Liquid Crystals, Department of Chemistry, Academic Press, England (1962) 1–21.
S. Chandrasekhar, Liquid Crystals, Cambridge University Press, Bangalore (1977) 1–13.
Shvartsman et al., Quasi-Liquid Crystals of Thermochromic Spiropyrans. A Material Between Supercooled Liquids and Mesophases, J. Phys. Chem. 1984, 88, 6448–6453.
Cabrera et al., Physical Cross-Linking of Mesomorphic Polymers Containing Spiropyran Groups, Macromolecules 1987, 20, 2713–1717.
Cabrera et al., Dynamic Ordering of Aggregated Mesomorphic Macromolecules, Nature vol. 326 Apr. 9, 1987 (582–585).
Mortazavi et al., Second-Harmonic Generation and Absorption Studies of Polymer-Dye Films Oriented By Corona-Onset Poling At Elevated Temperatures, 1989 Optical Society of America, vol. 6, No. 4/Apr. 1989/J. Opt. Soc. Am.B (733–741).
Meredith, VanDusen, and Williams, Optical and Non-Linear Optical Characterization of Molecularly Doped Thermotropic Liquid Crystalline Polymers, Macromolecules 1982, 15, 1385–1389.
David J. Williams, Nonlinear Optical Properties of Organic Polymeric Materials, ACS Symposium Series 233 (1983) 109–133.
Yitzchaik et al., Second Harmonic Generation by Merocyanine Mesomorphic Films. An Anomalous Electrostatic Field Effect Chemistry of Materials 1990, 2, 1962–168
Yitzchaik et al., A New Effect in Second Harmonic Generation by Poled Nematic Films. Adv. Mater 2 (1990) vol. 1 33–36.
Tom et al., Second-Harmonic Reflection from Silicon Surfaces and Its Relation to Structural Symmetry, vol. 51, No. 21, Physical Review Letters 1983–1986.

*Primary Examiner*—James W. Davie
*Attorney, Agent, or Firm*—Keck, Mahin & Cate

[57] ABSTRACT

In a system and method for generating second order nonlinear optical effects and in particular second order harmonic radiation (SHG), a beam of light is transmitted through and/or reflected from a substance which includes both at least one species selected from amorphous and glassy organic materials and at least one species of hyperpolarizable component, and which is in xy planar film or coating form or in light-transmissive 3-dimensional form and which substance is preferably subjected to a polarizing electric field, such that (a) when the substance is in the form of an xy planar film or coating, the field is applied in the plane of the film and the beam of light is caused to impinge thereon at angle other than normal to the xy plane, (b) when the substance is in 3-dimensional form, the field is applied along a line (an arbitrary x-axis) and the beam of light includes components polarized along at least one of the y- and z-axes; and (c) emergent SHG, which includes at least one component which is polarized perpendicular to the direction of polarization induced by the electric field in the hyperpolarizable component(s), is detected, observed, measured and/or utilized.

20 Claims, 5 Drawing Sheets

METHOD AND SYSTEM FOR PRODUCING SECOND ORDER NONLINEAR OPTICAL EFFECTS

FIELD OF THE INVENTION

The present invention relates to a system and a method for producing a novel and useful optical phenomenon, namely one characterized by the generation of second order nonlinear optical effects and in particular second order harmonic radiation including at least a component polarized perpendicular to the direction of an electric field imposed on a sample, through which incident radiation is transmitted and/or from which incident radiation is reflected.

BACKGROUND OF THE INVENTION

Poling a polymeric film containing dopant chromophore molecules or side-chain groups with high molecular hyperpolarizabilities ($\beta$) has become a widely used strategy for preparation of films with large second order optical nonlinearity exhibiting properties such as second harmonic generation (SHG) and electro-optic modulation. The usual method of film preparation involves applying a strong external electrostatic field (up to $10^6$ V/cm.) to a doped film heated to above its glass transition temperature ($T_g$), leading to a preferential alignment of dipolar chromophore groups along the field direction. Cooling to room temperature (below $T_g$) prior to removal of the field enables a "freezing in" of the net polar alignment. In practice, some residual molecular mobility is often retained, leading to a loss of the polar alignment over a period of time (ranging from minutes to months) which depends on both polymer matrix and chromophore properties.

Second order nonlinear optical processes such as SHG are described quantitatively by the second order susceptibility tensor $X^{(2)}$. Under the electric dipole approximation, a second-order polarization, $P^{2w}$, is induced by the incident (optical) electric field $E^w$ according to:

$$P^{2w}{}_i = X^{(2)}{}_{ijk} E^w{}_j E^w{}_k \qquad (1)$$

The observed second harmonic generation efficiency is proportional to the square of $P^{2w}$. From symmetry considerations, it is readily apparent from equation (1) that in a centrosymmetric medium all components $$X^{(2)}{}_{ijk} = 0.$$

Furthermore, in media symmetric about a plane i=0 all $X^{(2)}$ components containing the index i either one or three times must similarly be zero. Thus in the case of a polymer poled by an electric field along the x direction as discussed above, the only nonzero components are:

$$X^{(2)}{}_{xxx}, X^{(2)}{}_{xyy} = X^{(2)}{}_{xzz}, \text{ and } X^{(2)}{}_{yxy} = X^{(2)}{}_{zxz}$$

Such relationships between the various $X^{(2)}$ components of poled polymers have been found in various studies (see, e.g., Williams, D. J., Angew. Chem. Int., 1984, 23: 690, and Esselin, S. et al, SPIE Conf. Proc., 1988, 971: 120). It will be shown below, in accordance with one aspect of the present invention, how polymers can be poled so as to obtain additional nonzero $X^{(2)}$ components, arising from asymmetry not only along the poling direction (the x direction) but also in a direction z, which is perpendicular to the poling direction.

SUMMARY OF THE INVENTION

The present invention provides in one aspect a system for the generation of second order nonlinear optical effects and in particular second order harmonic radiation, which system comprises means for producing a beam of light and for directing the beam to impinge on and to be transmitted through and/or reflected from a sample of a material comprising first and second components, wherein the first component is a hyperpolarizable component (a) and the second component is a glass-forming organic material (b) providing a non-crystalline solid matrix in which said both first and second components are immobilized, and which sample is in a form selected from the group consisting of xy planar films, coatings and xyz 3-dimensional forms placed on a substrate between two parallel electrodes, such that at least one of the electrodes or the protrusion thereof is thinner than the sample, which sample is adapted for the transmission and/or reflection of the beam of light, means for subjecting the sample in such form to a polarizing electric field essentially along the x-axis thereof and means for detecting and measuring the second order nonlinear optical effects generated which are characterized by one or more $X^{(2)}$ components whose indices are, zzz, zxx, zyy and permutations thereof.

In one embodiment the system is characterized by the facts that (a) when the material is in the form of an xy planar film or coating, the polarizing electric field means is adapted to apply the field on the xy plane of the film or coating essentially parallel to the x-axis thereof and the beam of light producing and directing means is adapted to cause the impingement of the beam on the planar film or coating at an angle other than normal to the xy plane, and (b) when the material is in 3-dimensional form, the polarizing electric field means is adapted to apply the field essentially parallel to a line which is arbitrarily defined as an x-axis of the 3-dimensional form and the beam of light producing means is adapted to provide a beam which includes components polarized along at least one of the y- and z-axes relative to the x-axis; and (c) the system includes means for effecting at least one operation selected from detecting, observing, measuring and utilizing second order harmonic radiation emergent from the material, the emergent radiation including at least one component which is perpendicular to the direction of polarization induced by the electric field in the at least one species of hyperpolarizable component.

In general terms, the material comprises at least one species of a hyperpolarizable component (a) and at least one species of a glass-forming organic material (b), said first and second components being present as separate distinct species in a composition, or each of the first and second components is present as a portion of a single bifunctional molecular species.

The present invention provides in another aspect a method for the generation of second order nonlinear optical effects and in particular second order harmonic radiation, which comprises the steps of:

i preparing a sample of a material in an xy planar film or xyz tridimensional form on a substrate onto which parallel electrodes are placed, such that at least one of the electrodes or the protrusion thereof above the substrate is thinner than the sample, wherein said material comprises at least one species of a hyperpolarizable component (a) and at least one species of a glass-forming organic material (b) providing a non-crystalline solid matrix in which molecules are not mobile, the components (a) and (b) being either distinct species or portions of a bifunctional molecule;

ii subjecting the samples of step (i) to a polarizing electric field essentially along the x-axis thereof;

iii directing a beam of light to impinge on and to be transmitted through and/or reflected from the poled sample; and iv detecting and measuring the second order nonlinear optical effects generated which are characterized by one or more $X^{(2)}$ components whose indices are zzz, zxx, zyy and permutations thereof.

The sample of the material may be in an xy planar film, coating or 3-dimensional form adapted for the transmission and/or reflection of the beam of light, and the method is further characterized by the facts that (a) when the substance is in the form of an xy planar film or coating, the polarizing electric field is applied essentially parallel to the xy plane of the film or coating and the beam of light is caused to impinge on the planar film or coating at an angle other than normal to the xy plane, (b) when the substance is in 3-dimensional form, the polarizing electric field is applied essentially parallel to a line which is arbitrarily defined as an x-axis of the 3-dimensional form and the beam of light includes components polarized along at least one of the y- and z-axes relative to the x-axis; and (c) the method includes the additional step of effecting at least one operation selected from detecting, observing, measuring and utilizing second order harmonic radiation emergent from the material, the emergent radiation including at least one component which is perpendicular to the direction of polarization induced by the electric field in the at least one species of hyperpolarizable component.

The present invention provides in a particular embodiment, a method for the generation of second order harmonic radiation, which comprises the steps of:

subjecting a sample of a material as defined above to a polarizing electric field essentially along an axis defined as an x-axis of the material;

producing a beam of light and directing the beam to impinge on and to be transmitted through and/or reflected from the material; and effecting at least one operation selected from detecting, observing, measuring and utilizing emergent radiation characterized by one of more $X^{(2)}$ components whose indices are zzz, zxx, zyy and permutations thereof.

The term "hyperpolarizable component" in the present specification and claims means a chemical compound or structural component thereof which exhibits nonlinear polarizability. By way of example, such a component may exhibit e.g. a different electronic dipole moment in the molecular ground and excited states; and/or intramolecular charge transfer or electron delocalization. For a fuller description, reference may be made, for example to Williams, D. J., Angew.Chem.Int-.Ed. (1984) 23: 690, and Zyss, J., J.Mol.Electronics (1985) 1: 25, the disclosures of which are incorporated herein by reference.

The glass-forming organic material (b) should provide a non-crystalline solid matrix in which molecules are not mobile. It may itself be mesogenic or not. It may be, for example, a liquid crystal or an amorphous polymer or a low molecular weight glass-forming compound, such as the new compound 2',3'-dihydro-8-nitro-6-[4-(4'-hexyloxyphenylazo)phenylcarbonyloxymethyl]-1',3',3'-trimethylspiro(2H-1-benzopyran-2,2')indole, hereinafter referred to as AzISP, which also forms part of the present invention.

The term "mesogenic component" in the present specification and claims means a chemical compound or structural component thereof which tends to cause the formation of liquid phase or amorphous structures which are not isotropic or random over a particular temperature range. For a fuller description, reference may be made, for example, to Gray, G. W., Molecular Structure and the Properties of Liquid Crystals, Academic Press, London 1967, and Chandrasekhar S., Liquid Crystals, Cambridge University Press, 1977, the disclosures of which are incorporated herein by reference.

BRIEF DESCRIPTION OF THE DRAWINGS

FIG. 1a is a top view and FIG. 1b is a side view, showing nonlinear optical activity induced along both the x direction (parallel to poling direction) and along the z direction (perpendicular to poling direction).

DETAILED DESCRIPTION OF THE INVENTION

Figure 1B:
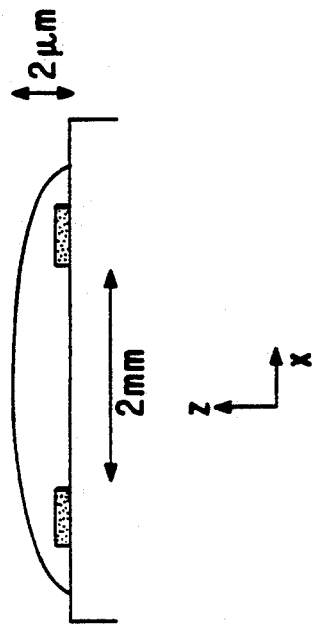
FIGS. 1a and 1b illustrate the mounting of a sample and electrodes on a slide for use in an embodiment of the invention.

In a particular embodiment of the system and method of the invention, in the light-transmitting and/or reflecting material, the organic glass-forming component may be present in the form of at least one compound selected from a first group consisting of monomeric and polymeric compounds, and the hyperpolarizable component may be present in the form of at least one compound selected from a second group consisting of monomeric and polymeric compounds, the members of the first being completely different from the members of the second group. Mesogenic glass-forming species may be homopolymers of 6-[4-(4-methoxyphenoxycarbonyl)-phenoxyhexyl]acrylate and 6-[4-(4-cyanophenoxycarbonyl)phenoxyhexyl]acrylate, as well as copolymers of these monomers with each other and with other suitable comonomers such as alkyl acrylates and methacrylates, and acrylonitrile, provided of course that any resulting copolymer to be used for the purposes of the present invention has mesogenic characteristics. Amorphous glass-forming components may be polymethymethacrylate (PMMA), polyacrylates, polystyrene and polycarbonates. Examples of the hyperpolarizable component are e.g. 4-dimethylamino-4'-nitrostilbene (DANS) as well as the quasi-crystalline materials of U.S. Pat. No. 4,405,733 and the merocyanine component thereof, the disclosure of this U.S. patent being incorporated herein by reference.

In another embodiment of the system and method of the invention, in the light-transmitting and/or -reflecting material, the at least one species of glass-forming component and the at least one species of hyperpolarizable component are both present simultaneously in at least one compound selected from a third group consisting of monomeric and polymeric compounds. Examples of this third group are e.g. the quasi-liquid crystal forming compounds disclosed in U.S. Pat. No. 4,927,917, the contents of this patent being incorporated herein by reference. Another example is the photochromic liquid crystal polymer designated PLCP-1 in Table 1 herein, as well as an ethylenic copolymer containing side-chain units of 6-[4-(4-methoxyphenoxycarbonyl)phenoxyhexyl] acrylate and/or 6-[4-(4-cyanophenoxycarbonyl)phenoxyhexyl] acrylate, as well as side-chain units of an ethylenic monomer (ECP) incorporating the 4-dimethylamino-4'nitrostilbene structure (the acrylates to monomer ratio being e.g. 1:4 by weight). Mixtures of such quasi-liquid crystal forming compounds and photochromic polymers may also be used for this purpose and constitute a further embodiment of the invention. Such mixtures are exemplified below. It will be appreciated that one or more substances selected from this third group can also be admixed with one or more substances selected from the first group described above and/or one or more substances selected from the second group described above.

In the material of the invention which is a bifunctional polymer molecule, it is preferred that at least one of the following conditions is fulfilled, namely:

the at least one species of mesogenic component is present in a main chain of the at least one polymer: and/or the at least one species of hyperpolarizable component is present in a main chain of the at least one polymer; and/or the at least one species of mesogenic component is present in side chains of the at least one polymer; and/or the at least one species of hyperpolarizable component is present in side chains of the at least one polymer.

In a particular embodiment the material comprises a copolymer incorporating a hyperpolarizable component which may be prepared by copolymerization of at least one ethylenically unsaturated monomer having hyperpolarizable properties with at least one non-hyperpolarizable ethylenically unsaturated monomer, such as PLCP-1 AND DR-PMMA copolymers described herein.

Figure 7:
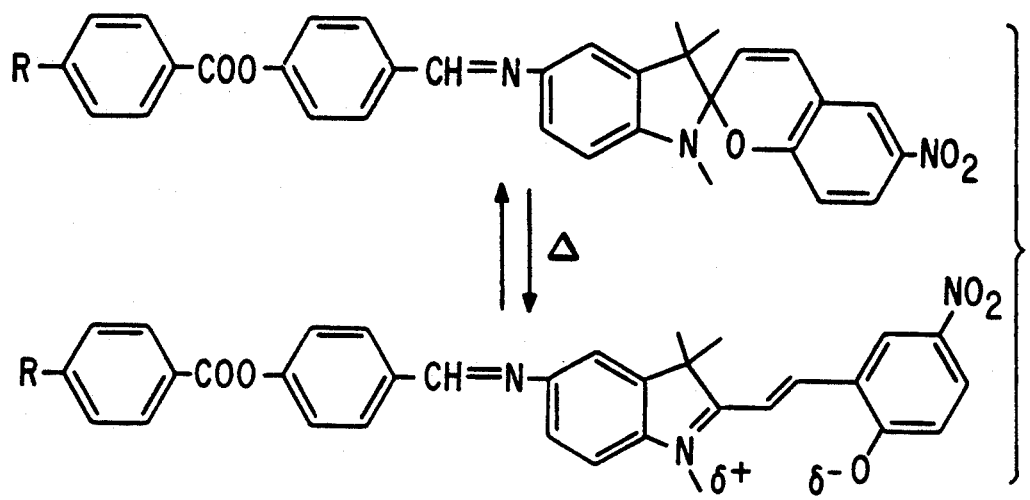
FIG. 7 depicts the formula of the quasi-liquid crystal compounds designated QLC-1 (R=OCH$_3$) and QLC-2 (R=OC$_6$H$_{13}$).

In another embodiment, the material comprises at least one quasi-liquid crystal component which comprises a spiro-compound depicted in FIG. 7 and chemically equivalent 2,2'-indoline-spiro-(fused ring)pyran or 2,2'-indoline-spiro-(fused ring)1',4'-oxazine derivatives having quasi-liquid crystal properties.

Figure 6:
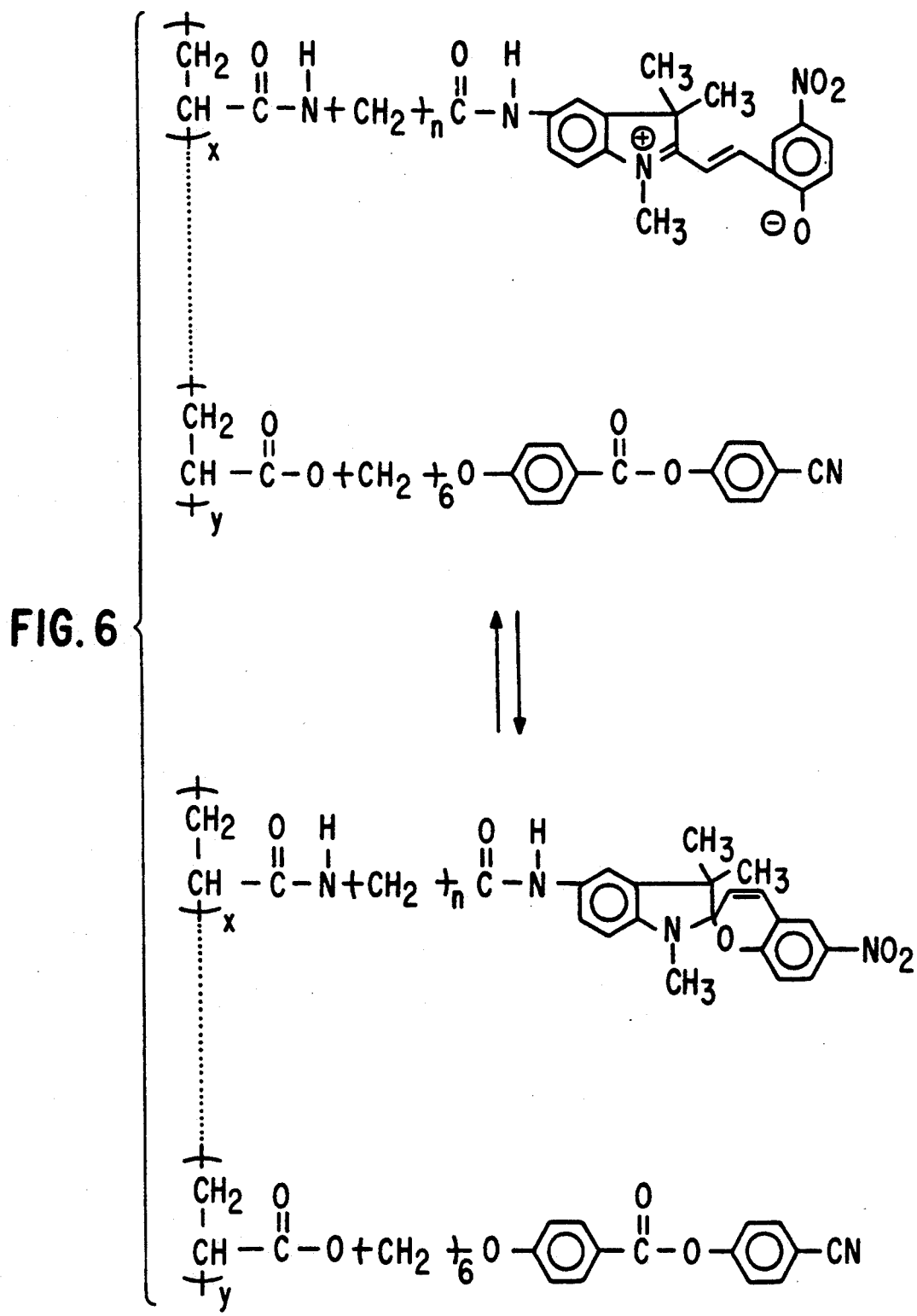
FIG. 6 depicts the formula of the photochromic liquid crystal polymer designated PLCP-1.

In yet another embodiment, the material comprises a quasi-liquid crystal component selected from the compound depicted in FIG. 7 herein wherein R is methoxy or hexyloxy, and a polymer comprising both a mesogenic and a hyperpolarizable component, such as the polymer depicted in FIG. 6 herein. In one embodiment, preferred weight ratios are for (total quasi-liquid ingredients): polymer substantially 1:4. The molecular weight of the polymer may fall within the range of about 20,000 to about 30,000.

In still a further embodiment of the invention, the hyperpolarizable component has no mesogenic component, e.g., 4-dimethylamino-4'-nitrostilbene, and the polymeric mesogenic component has no hyperpolarizable component, e.g., 6-[4-(4-methoxyphenoxycarbonyl)-phenoxyhexyl]acrylate homopolymer and 6-[4-(4-cyanophenoxycarbonyl)phenoxyhexyl]acrylate homopolymer, the weight ratio preferably lying within the range 1:20–100.

In another embodiment of the invention, the material comprises two different quasi-liquid crystal components, e.g. the compounds depicted in FIG. 7 herein where R is methoxy (i) and hexyloxy (ii), and a hyperpolarizable component (iii) with no mesogenic components, e.g., 4-dimethylamino-4'-nitrostilbene. In this case, the weight ratio [(i)+(ii)]:(iii) preferably lies within the range 20–100:1 and the weight ratio (i):(ii) is substantially 1:3.

The materials used in the invention and particularly the compositions described above are made applicable for nonlinear optical applications by the poling process, in which an electric field is applied to the composition at an elevated temperature, whene molecular mobility in the composition is more facile, followed by cooling and removal of the electric field.

The difference between the present invention and earlier poling studies is that in the present invention a special poling geometry is used, a preferred embodiment of which is described later. This poling geometry might be responsible for the new nonlinear optical effects obtained according to the invention.

It may be noted generally that in the embodiment of the invention combining a hyperpolarizable component with a glass-forming component, the effect of raising the temperature may reversibly change the glassy nature of the glass-forming component, while the hyperpolarizable component is aligned by the imposed electric field. That is to say, on cooling the glass-forming component returns to the glassy state, while the hyperpolarizable component retains its alignment.

It will be apparent that the coatings referred to may be coatings on planar or curved surfaces and that the three-dimensional forms include e.g. waveguides, which may themselves be coated. Persons skilled in the art will be aware in what manner the present invention may be adapted according to the form of the substance through which the beam is transmitted and/or from which it is reflected.

Second order nonlinear optical effects [i.e. all $X^{(2)}$ effects] include besides SHG, by way of example, sum and difference frequency generation, optical parametric oscillation and amplification and the electro-optic (Pockel's) effect. The present invention is also expected to find utilization in the fields of piezoelectrics, fiber optics and waveguides.

While the detailed examples herein describe the transmission of a beam of light, reflection can be obtained from the samples themselves or enhanced by use of coatings of e.g. silver, gold or aluminum, as will be apparent to skilled persons.

It will also be apparent to skilled persons that this invention may be applicable to additional material compositions, such as where the organic glass is replaced by non-organic glasses. It should also be applicable to other materials, such as resins and elastomers which are similar to glasses in that molecules may be poled and immobilized therein, but differ in that this state is formed irreversibly in the former, whereby a mobile state may be restored to glasses.

The new optical effect which characterizes the present invention possesses the notable advantages that strong nonlinear optical effects and SHG signals can be obtained, and that the fact that one can obtain SHG polarized along two perpendicular directions means in turn that phase matched SHG should be feasible, i.e. the fundamental and harmonic propagate through the medium with the same refractive index, enabling the highest SHG conversion efficiency to be obtained.

As will be apparent from the particular illustrative embodiments of the invention described below, if the material in question is subjected to a polarizing electric field along an axis defined as an x-axis of the material, then the emergent radiation modified relative to the input radiation is characterized by one or more $X^{(2)}$ components which contain as their three indices, x as zero or two times and y and/or z as one or three times, such as

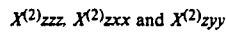

$X^{(2)}_{zzz}$, $X^{(2)}_{zxx}$ and $X^{(2)}_{zyy}$ and so forth.

The invention provides thus a new means for the production of poled polymer films for second order nonlinear optical applications, in particular second harmonic generation, electro-optical modulation, etc. The advantages and new features of this invention are:

1. Asymmetry and consequently the nonlinear optical properties are induced simultaneously along two directions. Production of nonlinearity perpendicular to the poling direction (i.e. along the z-direction in FIG. 1b) has never been achieved before.

2. Production of extremely high nonlinear optical efficiency along the z-direction, this nonlinearity being caused by a new mechanism, different from that which causes nonlinearity along the x-direction.

The invention can be exploited for applications which either: (a) use the high nonlinear efficiency along the z-direction, or (b) make use of the simultaneous nonlinear optical properties along the two directions.

EXAMPLES

I PREPARATION OF MATERIALS

1. Preparation of PLCP-1

The photochromic liquid crystal polyacrylate depicted in FIG. 6 with n=5 (denoted below by PLCP-1) containing ~20% of spiropyran comonomer (x:y=1:4), M.W.=2.5×10⁴, was prepared by free radical copolymerization in 3:1 toluene-THF solution, as described by Yitzchaik S. et al. Macromolecules (1990) 23:707.

2. Preparation of QLC-1 and QLC-2

The quasi-liquid crystals depicted in FIG. 7 with R=$C_6H_{13}O$— and $CH_3O$— (denoted by QLC-1 and QLC-2, respectively) were synthesized as described by Shvartzman F. P. and Krongauz, V. (J. Phys. Chem. (1984). 88: 6448). The disclosure of this publication is incorporated herein by reference.

Figure 8:
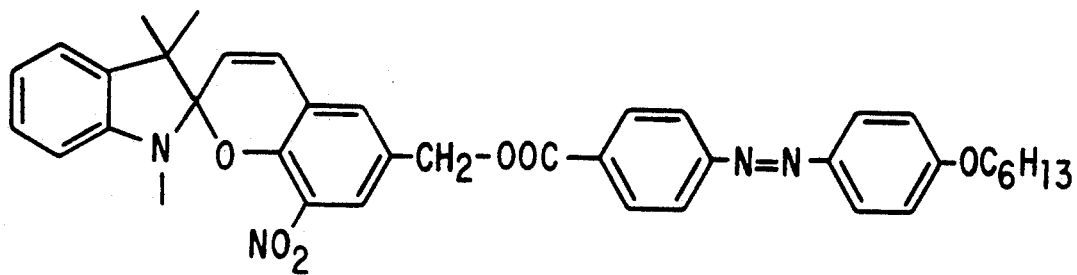
FIG. 8 depicts the formula of the compound designated AzISP.

3. Preparation of 2',3'-dihydro-8-nitro-6-[4-(4'hexyloxyphenylazo)-phenylcarbonyloxymethyl]-1',3',3,-trimethylspiro(2H-1-benzopyran-2,2')indole (AzISP) (see FIG. 8)

(a) 5-chloromethyl-3-nitrosalicylaldehyde 179 g. (0.01 mole) of 5-chloromethylsalicylaldehyde, prepared according to Angyal, S. J. et al, J. Chem. Soc. 1950, 2145, was dissolved in 20 ml. of glacial acetic acid. To this solution there was added a solution of 0.63 g. fuming nitric acid in 10 ml. glacial acetic acid over 30 minutes, keeping the mixture at 30° C., followed by stirring at 30° C. for 2 hours. The solution was then poured over ice to give a precipitate which was crystallized from methylene chloride giving the title product. Another crop was obtained by extraction of the aqueous phase, drying with anhydrous sodium sulfate, evaporation and crystallization from methylene chloride. Total yield: 53%.

(b) 2',3'-dihydro-8-nitro-6-hydroxymethyl-1',3',3'-trimethylspiro(2H-1-benzopyran-2,2')indole To a solution of the product of part (a) (1.21 g.; 4.26 mmol) and 0.75 ml. commercially available Fisher base in 11 ml. absolute ethanol, 1,3,3-trimethylindoline was added, the mixture refluxed for 30 minutes, and the ethanol was removed by evaporation. The residue was chromatographed on silica and eluted with ethyl acetate to give the title product in 30% yield.

(c) AzISP

To a solution of the product of part (b) (0.15 g.) and 4-(4'-hexyloxyphenylazo)benzoic acid (0.14 g.) (prepared according to Hall, H. K. et al, Macromolecules, 1989, 22: 3525), in dry tetrahydrofuran, there were added 88 mg. dicyclohexylcarbodiimide and 5 mg. dimethylaminopyridine. The mixture was stirred for 24 hours at room temperature, filtered, and the solvent removed by evaporation. The residue was chromatographed on silica and eluted with 1:5 ethyl acetate/hexane, to give the title product.

4. Preparation of the DR-PMMA copolymer (Disperse Red-Polymethylmethacrylate)

Figure 9:
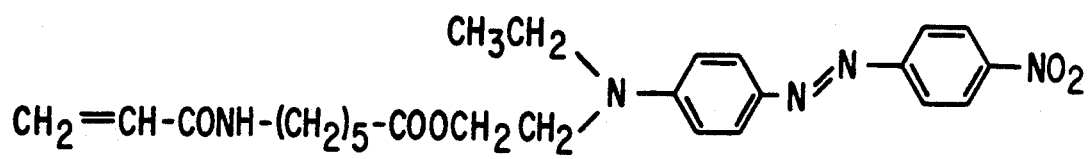
FIG. 9 depicts the formula of the ester of Disperse Red (DR) used as a comonomer.

This copolymer is prepared by copolymerization of commercial methyl methacrylate monomer with the ethylenically unsaturated monomer depicted in FIG. 9 which incorporates a hyperpolarizable chromophore. This monomer is obtained by esterification of Disperse Red (Aldrich) with 6-acryloylaminohexanoic acid (prepared according to Cabrera, I. and Krongauz, V., Macromolecules (1987), 20: 2713) and commercially available dicyclohexylcarbodiimide for 18 h at room temperature, after which the reaction mixture was poured into water. The crude product was purified by flash chromatography.

The monomer of the formula given in FIG. 9 was then copolymerized with methyl methacrylate in tetrahydrofuran at 60° C. for 13 h. The molar feed ratio of the two monomers was 10:90 (i.e. excess of methyl methacrylate). The solution contained 10% total monomers by weight, and 2% of the initiator AIBN (azoisobisbutyronitrile). Prior to reaction, the solution was thoroughly outgassed by the conventional freeze-thaw technique, and then sealed under vacuum. The copolymer product was purified by two reprecipitations from methanol, and then dried under vacuum. Yield:40%. The polymer glass transition temperature was 82° C.

The composition of the polymer was determined by dissolving the polymer in tetrahydrofuran and measuring the UV-visible absorption of the azo group. It was thus determined that the content of the hyperpolarizable species in the copolymer product was 4 mole %.

II FILM PREPARATION

Preparation of polymer and QLC films and their alignment in an electric field have been described previously by Cabrera I. and Krongauz V. (Nature (1987) 326: 582 and Macromolecules (1987), 20: 2713), and by Shvartsman, F. P. and Krongauz, V. (J. Phys. Chem. (1984), 88: 6448). The disclosure of these publications are incorporated herein by reference.

Figure 1A:
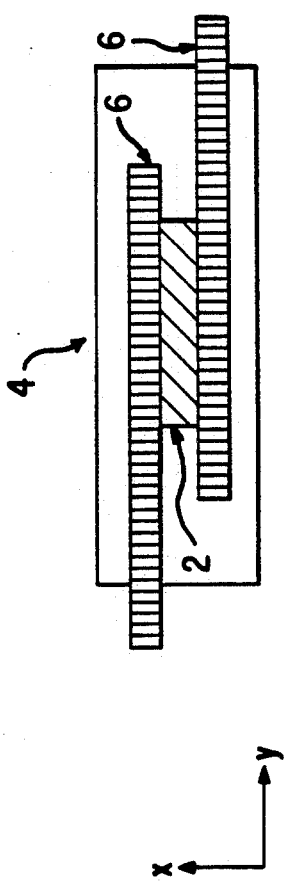

In FIG. 1a (top view) and FIG. 1b (side view), a film 2 of the material being examined for SHG measurements was prepared by casting from, e.g., benzene-THF solution (2:1) onto a hot (~80°) glass slide 4, onto which parallel thin film electrodes 6 had been deposited 2 mm apart. After casting, the film is dried in vacuum at 45° C. for 2 h.

The ratio between the thickness of the electrodes and of the sample lies within the range of from 1:3 to 1:700, preferably from 1:7 to 1:500 and most preferably from 1:20 to 1:200.

In a preferred embodiment of the invention the electrodes are about 300 Angstroms thick (i.e. in the z direction), while the film of material which covers both the electrodes and the space between them, is a few microns thick, e.g. $0.2$-$20\mu$. This geometry ensures that the poling field is always in the plane of the film.

Films are poled by applying a voltage of 2-2.5 kV across the electrodes, equivalent to an electric field of ~10 kV/cm, when the film is at a temperature above the glass transition temperature ($T_g$) but below the clearing temperature ($T_c$). The film is then cooled to room temperature before removing the field.

Samples containing PLCP-1 or QLC were simultaneously irradiated, imparting a deep red colour indicative of a considerable presence of the merocyanine form of these materials. This color slowly faded over 1-2 weeks.

III MEASUREMENTS

Methods of material characterization and film examination, including gel permeation chromatography, differential scanning calorimetry (DSC), polarization microscopy and optical absorption have been described in the prior art.

Figure 2:
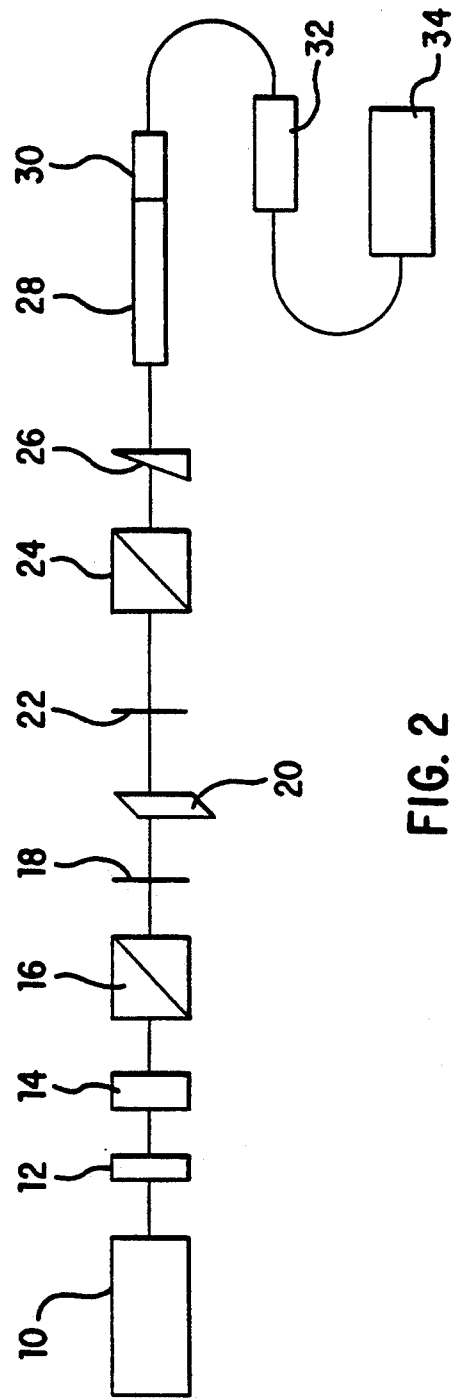
FIG. 2 illustrates a system for the generation of second order harmonic radiation in accordance with an embodiment of the invention.

The experimental system for SHG is depicted in FIG. 2. A Neodymium-YAG laser 10 (Spectra-Physics DCR-11) provides 8 ns pulses of 1064 nm radiation at a repetition rate of up to 10 Hz. Only a small amount (usually 0.1-6 mJ/pulse) of the available laser pulse energy is utilized, and the laser beam is weakly focussed to a diameter of 1-2 mm. at the sample 20. It will be appreciated that in accordance with the present invention, the input beam may be directed at the sample at any angle other than normal to the plane of the imposed DC electric field. In the exemplified embodiment, the slide on which the sample of material is mounted may for this purpose be placed at a fixed angle (such as—merely by way of example—at 30° or 45° to the incident beam of light, or for comparative purposes at 90° thereto. In an alternative embodiment (not illustrated), the slide may be rotated by any conventional means, such as a rotating mount, to achieve the desired angle relative to the incident beam; in a further possible alternative embodiment (not illustrated), conventional means (such as a prism) may be interposed between item 18 and the sample in order to bend the incident light to the desired angle, in which case it would be convenient to interpose also similar conventional means between the sample and item 22 (below) in order to bend the emergent light back again in order to be processed as described. The laser polarization can be varied using a /2 plate 14 and a polarizer 16. The input cut-off filter 18 (Schott RG-610) eliminates any harmonic radiation which may have been produced by the laser or optical components. After passing through the sample the fundamental beam is blocked by the output filter 22 (Schott BG-39) which transmits any generated 532 nm. radiation through a polarizer 24, a medium resolution monochromator 28 (Jobin Yvon H20-UV) and a high gain photomultiplier 30 (RCA 8575). A quartz wedge depolarizer 26 is employed to eliminate any dependence of detection efficiency on polarization. The PMT output is amplified 25 fold at preamplifier 32, and analyzed by a gated photon counter 34 (Stanford Research SR 400) gating synchronously with the laser pulse. Where necessary the signals were reduced in a controlled manner [by means of attenuator 12 on the input side and/or by an attenuator (not shown) on the output side] so that the photon counter registered an average count rate of $\leq 0.4$ photons/pulse. Typically, signals were averaged over $\approx 1000$ pulses. It was verified that the detector response arose from genuine SHG by checking that signals scaled with the square of the input laser intensity; and that the signals vanished when the detection monochromator was detuned from 532 nm., or when the detector gating was not synchronous with the laser pulse, or when the sample was removed.

In all experiments recorded, SHG was measured at room temperature in transmission with the electric field alignment direction (designated the x axis) vertical, and sample xy plane (and thus also the plane of the electric field) at either 10° to 70°, preferably at 45°, or normal to the input laser.

Thus, the latter geometry (normal to the input laser), which was employed by Hsiung H. et al (J. Chem. Phys. 1987, 87: 3127), can only probe the in-plane $X^{(2)}$ components (i.e. those with only x and y indices). In the 45° geometry (in accordance with an embodiment of the present invention) a horizontal fundamental or harmonic field therefore contains a component in e y and z directions, thus also accessing $X^{(2)}$ components with z indices.

During some SHG measurements an electric field was simultaneously reapplied across the electrodes (the sample was kept at room temperature). The electric field applied during SHG measurements did not exceed that applied during sample preparation.

The small thickness of the samples ($\approx 1$-2 $\mu$m.) meant that reabsorption of 532 nm. light via the tail absorption of the merocyanines was not a significant problem, and since such thicknesses are less than typical coherence lengths, destructive interference effects (Maker fringes) should be avoided (Mortazavi M. A. et al, J. Opt. Soc. Amer. B 1989, 6: 733; Meredith G. R. et al, Macromolecules 1982, 15: 1385, and Nonlinear Optical Properties of Organic and Polymeric Materials, ACS Symposium Series No. 233, Washington 1983: 109). The disclosures of these publications are incorporated herein by reference.

IV DISCUSSION OF RESULTS

Second Harmonic Generation

It has been found that when certain compositions of materials are poled as described above, they exhibit SHG via $X^{(2)}$ components other than those expected according to results found by earlier workers $(X^{(2)}xxx, X^{(2)}xyy, X^{(2)}xzz, X^{(2)}zxz, X^{(2)}yxy)$.

In particular, this is demonstrated by the generation of SHG, in which a horizontally polarized fundamental generates a horizontally polarized SHG signal. SHG so produced is hereinafter denoted $I_{h-h}$; vertically polarized SHG induced by a vertically polarized fundamental is similarly denoted $I_{v-h}$, and horizontally polarized SHG induced by a vertically polarized fundamental is denoted $I_{v-v}$.

Figure 3:
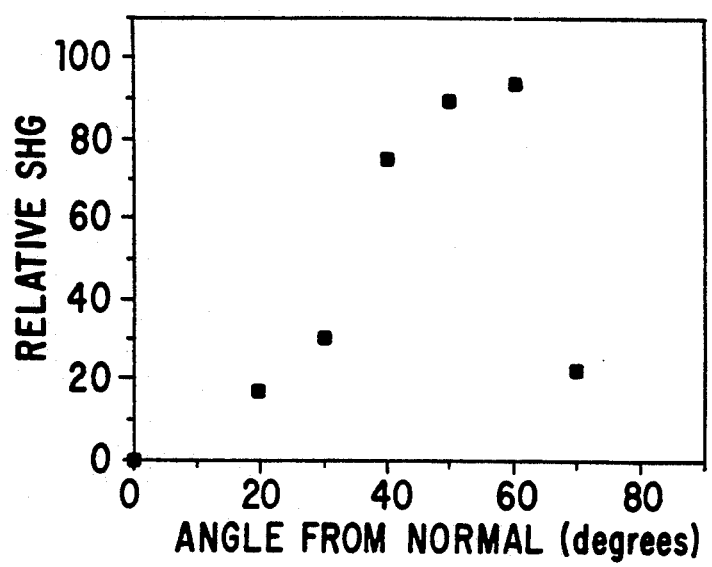
FIG. 3 illustrates the angular dependence of SHG of a 2% DANS-PMMA blend.

The $I_{h-h}$ signal was usually demonstrated when the sample was placed so that its xy plane was at 45° to the input laser, but can be observed for any incidence angle other than normal to the laser beam (see FIG. 3).

As described above, our samples were prepared by electric field poling (in the plane of the sample) at elevated temperature, followed by cooling to room temperature before removing the electric field. After a certain time interval (ranging from minutes to days) SHG from the sample was examined in the absence of any applied DC field. It was observed that some samples already exhibited $I_{h-h}$ SHG under these conditions, whereas others only showed this effect when a DC electric field was reapplied at room temperature. The DC electric field was obtained by applying a voltage of 2000–2500 volts between the electrodes, which are 2 mm. apart. The $I_{h-h}$ signals at 45° incidence from various samples are presented in Table 1; the $I_{v-v}$ signals are also presented for comparison.

Measurements were made with different compositions displaying $I_{h-h}$ SHG, each representing a different combination of glassy and hyperpolarizable species, as follows:

2% DANS-PMMA: a blend of a hyperpolarizable species and an amorphous polymer

DR-PMMA: an amorphous copolymer incorporating the hyperpolarizable species

AzISP: a glass formed by a non-polymeric molecules which incorporates a hyperpolarizable chromophore 2% DANS-HOMO-1: a blend of a hyperpolarizable species and a liquid crystal polymer PLCP-1: a liquid crystalline copolymer incorporating the hyperpolarizable species QLC: a nematic glass formed by a non-polymeric molecules which incorporates a hyperolarizable chromophore The PLCP-1-QLC-1 blend demonstrates that mixtures of two of the above combinations may also be used.

Key to the abbreviations

PLCP-1 = photochromic liquid crystal polyacrylate of FIG. 6 with n=5 containing ~20% of spiropyran comonomer (x:y=1:4), M.W.=25,000

QLC-1 = quasi-liquid crystals of compound of FIG. 7 with R=$OC_6H_{13}$

QLC-2 = quasi-liquid crystals of compound of FIG. 7 with R=$OCH_3$

PMMA = polymethyl methacrylate film substrate instead of glass

DANS = 4-dimethylamino-4'-nitrostilbene

HOMO-1 = 6-[4-(4-cyanophenoxycarbonyl)phenoxyhexyl] acrylate homopolymer

DR = Disperse Red derivative of FIG. 9.

In Table 1, $I_{v-v}$ = signal for vertically polarized input, vertically polarized SHG output; $I_{v-h}$ = vertically polarized input, horizontally polarized SHG output, etc. It should be noted that some scatter of signal strengths is observed from different samples of nominally identical composition; this may be attributed to small differences in thickness and alignment.

TABLE 1

| | Relative SHG Signal Strengths | | | | |
|---|---|---|---|---|---|
| | No Field[1] | | In DC Field $1 \times 10^4$ V/cm[1] | | |
| | $I_{v-v}$ | $I_{h-h}$ | $I_{v-v}$ | $I_{h-h}$ | $I_{v-h}$ |
| pure PMMA | <0.1 | <0.1 | <0.1 | <0.1 | <0.1 |
| 2% DANS-PMMA* | 40 | 3 | 200 | $3 \times 10^4$ | n.r. |
| DR-PMMA copolymer | 10 | 40 | 30 | $1 \times 10^3$ | n.r. |
| AzISP | <0.5 | 1 | 30 | $2 \times 10^4$ | n.r. |
| 2% DANS-HOMO-1* | 0.8 | <0.1 | 1600 | 1000 | n.r. |
| PLCP | 1–2 | <0.1 | 5–10 | 40–60 | n.r. |
| QLC.1-QLC.2 1:3* | 0.4–1.0 | <0.1 | 10–30 | 300–900 | 150 |
| PLCP-QLC.1 4:1* | 3–10 | <0.1 | 20–30 | 400–800 | 100 |

* = blends; n.r. = not recorded

[1]*In all samples, both with and without the field, $I_{h-v}$ signals were not observed*

SHG is observed from all samples containing hyperpolarizable material; no signal is obtained from (e.g.) pure PMMA. From the dependence of the $I_{h-h}$ signal on the incidence angle (see Table 2 and FIG. 3), it is seen that no signal is observed at normal incidence. Since at normal incidence the horizontally polarized direction is exactly parallel to the sample y axis, it is concluded that the samples retain isotropy along their y directions. Consequently, the $I_{h-h}$ signal at non-normal incidence is attributed to asymmetry along the sample z axis, i.e. the direction normal to the film plane. It should be noted that the observation of a Maximum $I_{h-h}$ signal for incidence at approximately 60° to the normal if also consistent with the $$X^{(2)}zzz$$

term making the dominant contribution to the $I_{h-h}$ signal. It can be similarly concluded that the $I_{v-h}$ signal arises from the $$X^{(2)}zxx$$

component.

By comparison with the SHG signal of a standard single crystal of quartz, it was found that the strongest $I_{h-h}$ signal strengths (with the electric field) correspond to $$X^{(2)}zzz$$

between $10^{-8}$ and $10^{-9}$ esu/cm$^3$.

When the sample was normal to the input laser beam, $I_{h-h}$ and $I_{v-h}$ signals were not observed either with or without an applied DC field. The $I_{v-v}$ signal was again observed in the absence of the DC field, which increased when the field was applied. Typical results are shown in Table 2.

TABLE 2

| | Relative SHG Signal Strengths at 45° and normal Incidence | | | |
|---|---|---|---|---|
| | no field | | DC field $1 \times 10^4$ V/cm. | |
| PLCP-QLC-1 4:1* | $I_{v-v}$ | $I_{h-h}$ | $I_{v-v}$ | $I_{v-h}$ |
| sample at 45° to beam | 3 | $5 \times 10^2$ | 20 | $1 \times 10^2$ |
| sample at normal to beam | 3 | 0.4 | 20 | 0.1 |

The appearance of the strong $I_{h-h}$ and $I_{v-h}$ signals in the electric field was unexpected, since the electric field is applied in the vertical direction only, and thus is not expected to induce asymmetry in either of the horizontal directions y or z. These signals did not vanish immediately when the DC field was shut off, thus eliminating the possibility that they were due to a $X^{(3)}$ process originating in either the sample or the substrate, and confirming that they were from a $X^{(2)}$ process whereby horizontal asymmetry is induced. The signals did however disappear eventually after the DC field was shut off; the rate of decay varying from sample to sample. Typically this happened over minutes to days. However, the signal could generally be restored again by re-applying the DC electric field.

Figure 4:
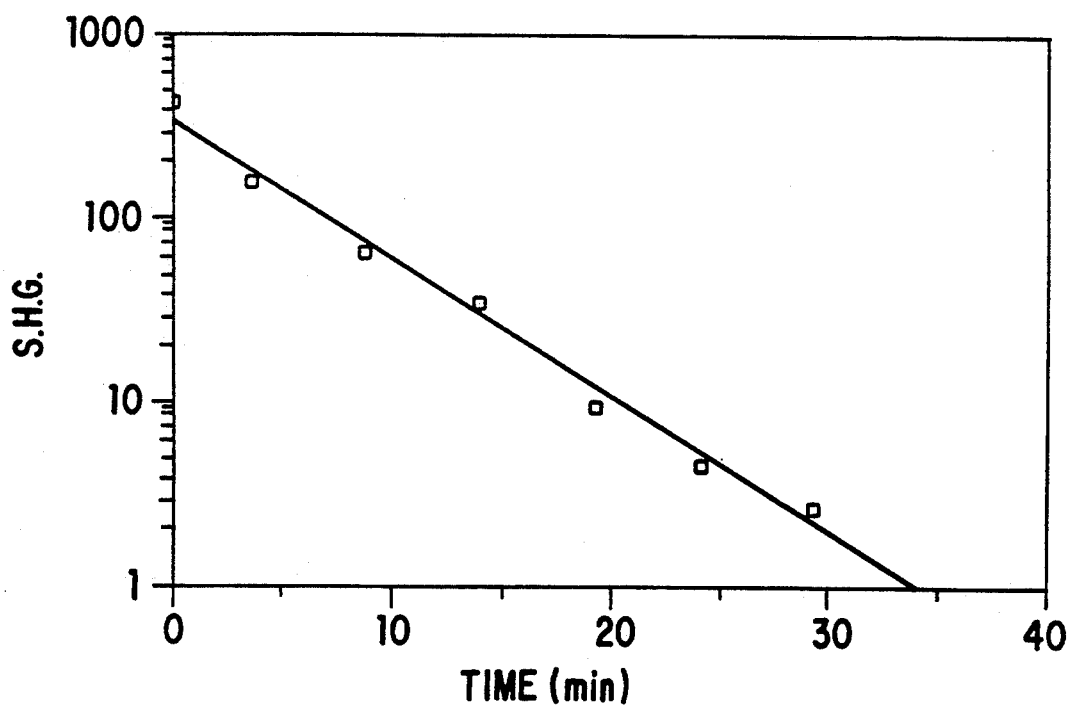
FIG. 4 shows decay of $I_{h-h}$ SHG signal of a QLC-1-QLC-2 1:3 blend following removal of the electric field.

Decay of the $I_{h-h}$ signal in a QLC-1–QLC-2 blend, after turning off the DC field, is shown in FIG. 4.

Figure 5:
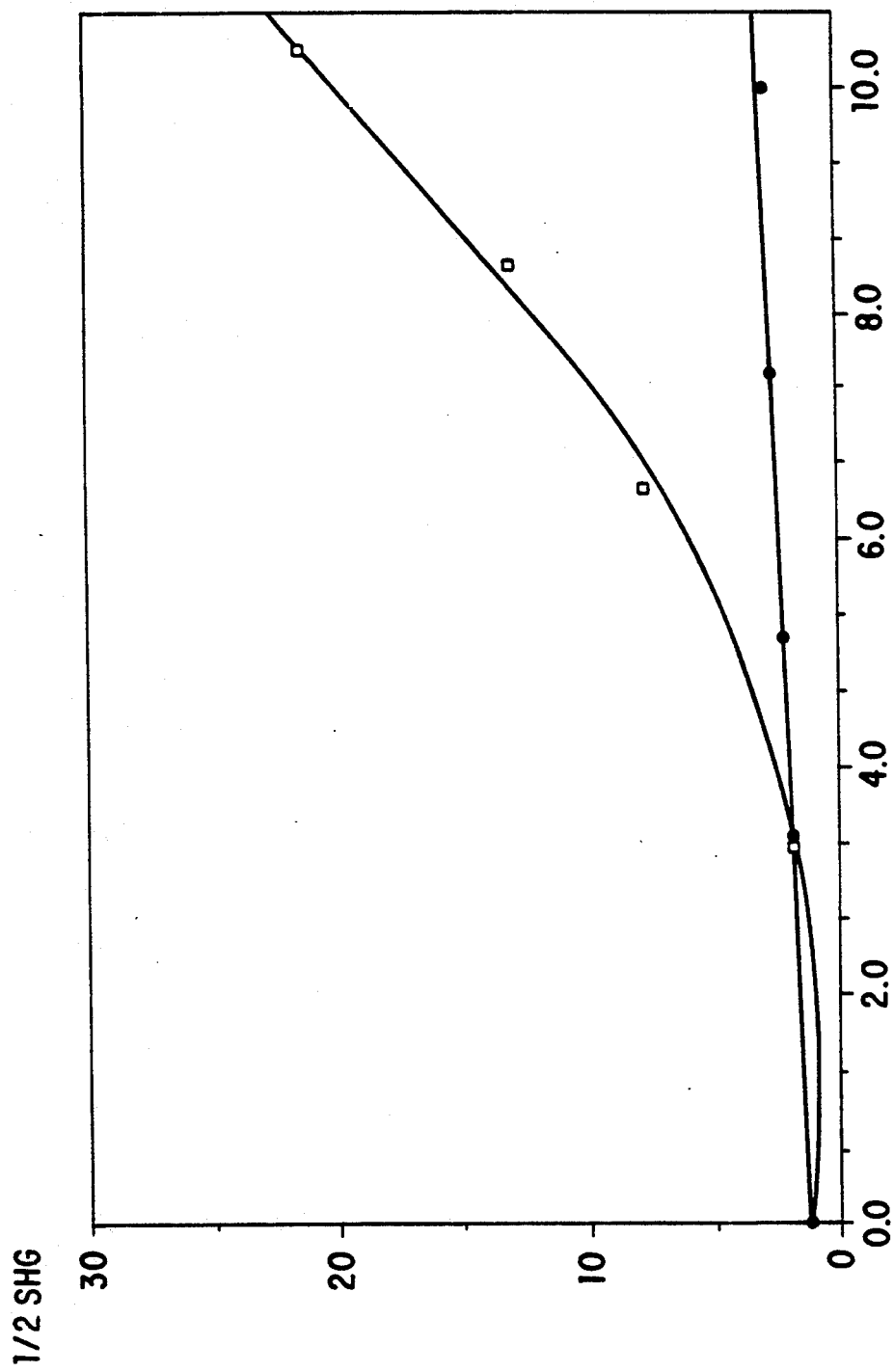
FIG. 5 shows dependence of $I_{v-v}^{0.5}$ (V) and $I_{h-h}^{0.5}$ (H) signals of the QLC-1-QLC-2 1:3 blend on the applied electric field.

Finally, it is noted that the dependence of the $I_{h-h}$ and $I_{v-v}$ signals on the electric field is different (see FIG. 5). $I_{v-v}^{0.5}$ $$(\sim X^{(2)}_{xxx})$$

increases relatively slowly and linearly with the electric field, in agreement with the work of Hsiung H. et al, loc cit, and the expected behaviour for interaction between isolated dipole moments and a DC electric field. The $$X^{(2)}_{zzz}$$

component, however, shows a different behaviour, which in the range studied can be fitted well by $I_{h-h}^{0.5}$ proportional to the square of the electric field (see FIG. 5).

While the present invention is not to be construed as limited by any theory, it is presently believed that the presence of dimers and/or higher aggregates of the hyperpolarizable species may be responsible for the $I_{h-h}$ SHG.

Another important factor in the production of the $I_{h-h}$ SHG may be the formation and migration of electric charges in the medium brought about by applying the DC electric field. Therefore, additional additives or treatment of the system which changes the charge transport properties might either enhance or depress the $I_{h-h}$ effect. Furthermore, the ratio of the thickness of the electrodes to the thickness of the fim may be a very important parameter.

While certain embodiments of the invention have been particularly described, it will be appreciated by persons skilled in the art that many variations and modifications may be made. The present invention is accordingly not to be construed as limited to such particularly described embodiments, rather its concept, spirit and scope will be understood with reference to the claims which follow.

We claim:

1. Method for the generation of second order nonlinear optical effects, including second harmonic generation, which comprises the steps of:
   i preparing a sample of a material in an xy planar film or xyz tridiminsional form on a substrate onto which parallel electrodes are placed, such that at least one of said electrodes or a protrusion thereof above said substrate is thinner than said sample, wherein said material comprises at least one species of a hyperpolarizable component (a) and at least one species of a glass-forming organic material (b) providing a non-crystalline solid matrix in which molecules are not mobile, said components (a) and (b) being either distinct species or portions of a bifunctional molecule;
   ii subjecting said sample of step (i) to a polarizing electric field essentially along the x-axis thereof;
   iii directing a beam of light to impinge on and to be transmitted through said poled sample; and
   iv detecting and measuring said second order nonlinear optical effects generated which are characterized by one or more $X^{(2)}$ components whose indices are zzz, zxx, zyy and permutations thereof.

2. Method according to claim 1 wherein said beam of light is directed to impinge on a planar film of said material at an angle other than normal to the xy plane and said second harmonic emergent radiation has at least one component of polarization perpendicular to the direction of polarization induced by the electric field.

3. Method according to claim 1 wherein said material comprises a composition of a hyperpolarizable component (a) and a glass-forming organic material (b) selected from an amorphous polymer, a liquid crystal polymer, and a low molecular weight glass.

4. Method according to claim 1 wherein said material is a bifunctional molecule comprising said hyperpolarizable component (a) chemically incorporated into component (b).

5. Method according to claim 4 wherein said bifunctional molecule comprises a hyperpolarizable chromophore incorporated into a component (b) selected from an amorphous polymer, a liquid crystal polymer and a low molecular weight glass.

6. Method according to claim 1, wherein the ratio of the thickness of at least one of said electrodes and of said sample is within the range of from 1:3 to 1:500.

7. Method according to claim 6 wherein said ratio is from 1:20 to 1:200.

8. Method according to claim 1 wherein step iii includes directing a beam of light to impinge on and to be transmitted through and reflected from said poled sample.

9. Method according to claim 1 wherein said material comprises two species of said hyperpolarizable component (a) and two species of said glass-forming organic material (b).

10. Method according to claim 9 wherein said material comprises a quasi-liquid crystal having the molecular structure:

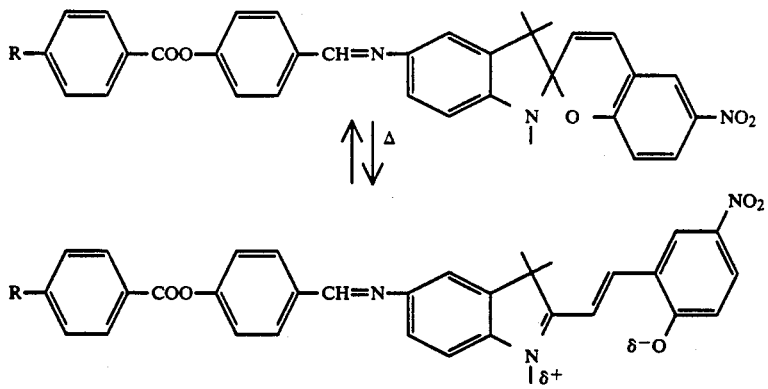

wherein R=OC₆H₁₃.

11. Method according to claim 9 wherein said material comprises a quasi-liquid crystal having the molecular structure:

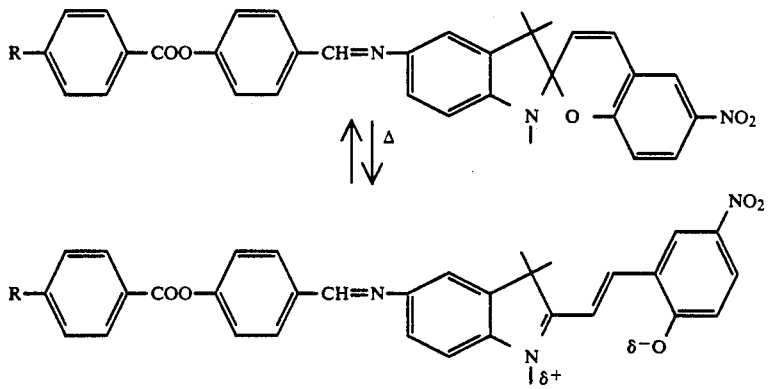

wherein R=OCH₃.

12. Method according to claim 2 wherein said beam of light is directed to impinge on said planar film of said material at an angle parallel to said xy plane.

13. Method according to claim 3 wherein said material comprises a composition of 4-dimehtylamino-4'-nitrostilbene and polymethyl methacrylate.

14. Method according to claim 3 wherein said material comprises a composition of 4-dimehtylamino-4'-nitrostilbene and 6-[4-(4-cyanophenoxycarbonyl)-phenoxyhexyl] acrylate homopolymer.

15. Method according to claim 5 wherein said bifunction molecule comprises an amorphous copolymer including said at least one species of said hyerpolarizable component, (a).

16. Method according to claim 5 wherein said bifunction molecule comprises a liquid crystal copolymer including said at least one species of said hyerpolarizable component (a).

17. Method according to claim 5 wherein said bifunction molecule comprises a glass formed by non-polymeric molecules including said at least one species of said hyerpolarizable component (a).

18. Method for the production of second order harmonic radiation from materials which have been poled by an electric field, said emergent harmonic radiation including at least one component of polarization perpendicular to the direction of said applied electric field, the method being characterized by the following steps:

i preparing a film of a material on a substrate onto which parallel electrodes are placed, such that at least one of said electrodes or a protrusion thereof above said substrate is thinner than said sample, wherein said material comprises at least one species of a hyperpolarizable component (a) and at least one species of a glass-forming organic material (b) providing a non-crystalline solid matrix in which molecules are not mobile, said components (a) and (b) being either distinct species or portions of a bifunctional molecule;

ii applying to said film a polarizing electric field parallel to an axis defined as the x-axis of said film; and iii causing light to impinge on the polarized film at an angle other than normal to the xy plane, whereby second order harmonic radiation is produced.

19. System for the generation of second order nonlinear optical effects, including second harmonic generation, which system comprises:

i means for subjecting a sample of a material to a polarizing electric field essentially along the x-axis thereof, wherein said sample is prepared in an xy planar film or xyz tridimensional form on a substrate onto which parallel electrodes are placed, such that at least one of said electrodes or a protrusion thereof above the substrate is thinner than said sample, said material comprising at least one species of a hyperpolarizable component (a) and at least one species of a glass-forming organic material (b) providing a non-crystalline solid matrix in which molecules are not mobile, said components (a) and (b) being either distinct species or portions of a bifunctional molecule;

ii means for producing a beam of light and for directing said beam to impinge on and to be transmitted through and/or reflected from said poled sample, said beam of light producing and directing means being adapted to cause the impingement of said beam at an angle other than normal to the xy plane; and iii means for detecting and measuring said second order nonlinear optical effects generated which are characterized by one or more $X^{(2)}$ components whose indices are zzz, zxx, zyy and permutations thereof.

20. Method for the generation of second order nonlinear optical effects, including second harmonic generation, which comprises the steps of:

i preparing a sample of a material in an xy planar film or xyz trideminsional form on a substrate onto which parallel electrodes are placed, such that at least one of said electrodes or a protrusion thereof above said substrate is thinner than said sample, wherein said material comprises at least one species of a hyperpolarizable component (a) and at least one species of a glass-forming organic material (b) providing a non-crystalline solid matrix in which molecules are not mobile, said components (a) and (b) being either distinct species or portions of a bifunctional molecule;

ii subjecting said sample of step (i) to a polarizing electric field essentially along the x-axis thereof;

iii directing a beam of light to impinge on and to be reflected from said poled sample; and iv detecting and measuring said second order nonlinear optical effects generated which are characterized by one or more $X^{(2)}$ components whose indices are zzz, zxx, zyy and permutations thereof.

* * * * *